United States Patent
Kadowaki et al.

(10) Patent No.: US 10,906,384 B2
(45) Date of Patent: Feb. 2, 2021

(54) VIBRATION PREVENTION DEVICE

(71) Applicants: YAMASHITA RUBBER CO., LTD., Fujimino (JP); HONDA MOTOR CO., LTD., Tokyo (JP)

(72) Inventors: Hirokazu Kadowaki, Saitama (JP); Masataka Hirano, Saitama (JP); Yusuke Arai, Saitama (JP)

(73) Assignees: YAMASHITA RUBBER CO., LTD., Fujimino (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/392,318

(22) Filed: Apr. 23, 2019

(65) Prior Publication Data

US 2019/0329640 A1 Oct. 31, 2019

(30) Foreign Application Priority Data

Apr. 26, 2018 (JP) ................... 2018-085781

(51) Int. Cl.
*B60K 5/12* (2006.01)
*F16F 1/36* (2006.01)
*F16F 13/10* (2006.01)

(52) U.S. Cl.
CPC .............. *B60K 5/1208* (2013.01); *F16F 1/36* (2013.01); *F16F 13/10* (2013.01)

(58) Field of Classification Search
CPC ...... B60K 5/1208; F16F 13/10; F16F 13/106; F16F 1/36; F16F 15/08
See application file for complete search history.

(56) References Cited

U.S. PATENT DOCUMENTS

| | | | | |
|---|---|---|---|---|
| 8,770,559 B2* | 7/2014 | Kadowaki | ............... | F16F 13/26 267/140.13 |
| 8,882,090 B2* | 11/2014 | Nishi | .................... | F16F 13/106 267/140.13 |
| 9,347,516 B2* | 5/2016 | Kadowaki | ............. | F16F 13/106 |
| 9,739,333 B2* | 8/2017 | Michiyama | .......... | B60K 5/1208 |
| 9,776,662 B2* | 10/2017 | Hirano | .................... | B60K 5/12 |
| 9,964,173 B2* | 5/2018 | Kadowaki | ............. | B60G 15/06 |
| 9,982,744 B2* | 5/2018 | Kadowaki | ............. | F16F 13/103 |
| 10,040,342 B2* | 8/2018 | Kadowaki | ............... | B60K 5/12 |
| 10,393,213 B2* | 8/2019 | Abe | ....................... | B60K 5/1208 |
| 10,408,297 B2* | 9/2019 | Kim | ........................ | F16F 13/10 |

(Continued)

FOREIGN PATENT DOCUMENTS

JP 2016-075343 5/2016

*Primary Examiner* — Bradley Duckworth
(74) *Attorney, Agent, or Firm* — Rankin, Hill & Clark LLP

(57) ABSTRACT

A vibration prevention device includes a vehicle body-side bracket having an inner space and a vibration prevention member disposed in the inner space. A press-fitting surface and a press-fitting groove are formed on an inner surface of the vehicle body-side bracket. The press-fitting surface and the press-fitting groove extend from an edge portion of the inner space opening through an outer surface of the bracket. The vibration prevention member has a first attachment member, a second attachment member, and an insulator disposed between the first attachment member and the second attachment member. The second attachment member has an abutting portion pressed against the press-fitting surface and an attachment portion press-fitted into the press-fitting groove.

13 Claims, 5 Drawing Sheets

(56) References Cited

U.S. PATENT DOCUMENTS

| | | | |
|---|---|---|---|
| 10,415,665 B2* | 9/2019 | Goto | F16F 13/08 |
| 2011/0101581 A1* | 5/2011 | Kubo | F16F 13/106 |
| | | | 267/140.13 |
| 2015/0276010 A1* | 10/2015 | Nakamura | F16F 13/101 |
| | | | 248/634 |
| 2017/0023088 A1* | 1/2017 | Kadowaki | F16F 13/106 |
| 2017/0211648 A1* | 7/2017 | Kadowaki | F16F 1/3849 |
| 2017/0305254 A1 | 10/2017 | Kadowaki | |
| 2018/0030581 A1* | 2/2018 | Michiyama | B22D 17/00 |
| 2018/0128344 A1* | 5/2018 | Kadowaki | B60K 5/12 |
| 2018/0320753 A1* | 11/2018 | Beckmann | B60K 5/1208 |
| 2019/0168595 A1* | 6/2019 | Tanaka | B60K 5/12 |
| 2019/0168596 A1* | 6/2019 | Komiya | F16F 13/10 |
| 2019/0248220 A1* | 8/2019 | Choi | B60K 5/1225 |
| 2020/0040961 A1* | 2/2020 | Romanski | F16F 13/26 |
| 2020/0049224 A1* | 2/2020 | Ueki | F16F 13/107 |

* cited by examiner

VIBRATION PREVENTION DEVICE

CROSS REFERENCE TO RELATED APPLICATION

This application claims priority of Japan patent application No. 2018-085781, filed on Apr. 26, 2018, the entire content of which is incorporated herein by reference.

FIELD OF THE INVENTION

This invention relates to a vibration prevention device.

BACKGROUND OF THE INVENTION

A vibration prevention device is disposed between a motor (e.g., an engine, etc.) and a vehicle body, and the motor is supported by the vehicle body through the vibration prevention device. The vibration prevention device comprises a vehicle body-side bracket having an inner space and a vibration prevention member disposed in the inner space. The vehicle body-side bracket is attached to the vehicle body.

The vibration prevention member comprises a first attachment member, a second attachment member, and an insulator disposed between the first attachment member and the second attachment member. The first attachment member is attached to the bracket attached to the motor.

The vibration prevention member is press-fitted into a vehicle body-side bracket. A press-fitting surface is formed on an inner surface of the vehicle body-side bracket and a side surface of the second attachment member is pressed against the press-fitting surface. According to a conventional vibration prevention device (e.g., JP2016-075343A), a vibration prevention member is securely fixed to a vehicle body-side bracket by increasing the height of a press-fitting surface of a vehicle body-side bracket and the height of a side surface of a second attachment member, i.e. by increasing the area of the press-fitting surface of the vehicle body-side bracket and the area of the surface of the second attachment member pressed against the press-fitting surface of the vehicle body-side bracket.

DESCRIPTION OF THE RELATED ART

JP2016-075343A discloses the vibration prevention device described above.

SUMMARY OF THE INVENTION

In a case where the height of a press-fitting surface of a vehicle body-side bracket and the height of a side surface of a second attachment member are increased as disclosed in JP2016-075343A, the height of the second attachment member and the height of the vehicle body-side bracket are increased and as a result the size of an entire vibration prevention device becomes large.

It is an object of the invention to provide a vibration prevention device which is capable of securely fixing a vibration prevention member to a bracket and of being compact in order to solve the technical problem described above.

The vibration prevention device of the invention comprises the bracket having an inner space and the vibration prevention member disposed in the inner space. The inner space opens through an outer surface of the bracket. A press-fitting surface and a press-fitting groove extending outwardly from the press-fitting surface are formed on an inner surface of the bracket. The press-fitting surface and the press-fitting groove extend from an edge portion of the inner space opening through an outer surface of the bracket. The vibration prevention member comprises a first attachment member, a second attachment member, and an insulator disposed between the first attachment member and the second attachment member. The second attachment member has an abutting portion pressed against the press-fitting surface and an attachment portion press-fitted into the press-fitting groove.

According to the vibration prevention device of the invention, the attachment portion is press-fitted into the press-fitting groove of the bracket, and therefore the area of the press-fitting surface of the bracket and the area of the corresponding outer surfaces of the attachment portion of the vibration prevention member is reduced, and, moreover, the vibration prevention member can be securely fixed to the bracket. Therefore, according to the vibration prevention device of the invention, the bracket and the vibration prevention member can be compact and the size of the entire vibration prevention device can be reduced.

According to the vibration prevention device described above, the bracket comprises an apex portion and a pair of legs extending in an down direction from the apex portion, and the inner space is formed between a pair of the legs, and the press-fitting surface and the press-fitting groove are formed on an inner surface of the leg. According to this configuration, the height of the press-fitting surface and the height of the abutting portion can be reduced, and the vibration prevention device is capable of securely fixing the vibration prevention member to the bracket, and therefore the heights of the bracket and the vibration prevention member can be reduced.

According to the vibration prevention device described above, all of the surfaces of the attachment portion abutting inner surfaces of the press-fitting groove are preferably pressed against the inner surfaces of the press-fitting groove. According to this configuration, the press-fitting grooves are small such that outer surfaces of the attachment portion are pressed against the inner surfaces of the press-fitting groove without a gap, and therefore the size of the bracket can be reduced.

According to the vibration prevention device, all of the surfaces of a protrusion portion of the attachment portion facing the inner surfaces of the press-fitting groove are preferably covered by an elastic member. According to this configuration, the elastic member is sandwiched between the inner surfaces of the press-fitting groove and outer surfaces of the protrusion portion, and therefore the attachment portion can be securely press-fitted into the press-fitted groove.

According to the vibration prevention device of the invention, the vibration prevention device is capable of securely fixing the vibration prevention member to the bracket, and the bracket and the vibration prevention member can be compact, and, therefore, the size of the entire vibration prevention device can be reduced.

BRIEF DESCRIPTION OF THE DRAWINGS

The invention will now be described with reference of the following drawings.

DESCRIPTION OF THE PREFERRED EMBODIMENT OF THE INVENTION

Figure 2:
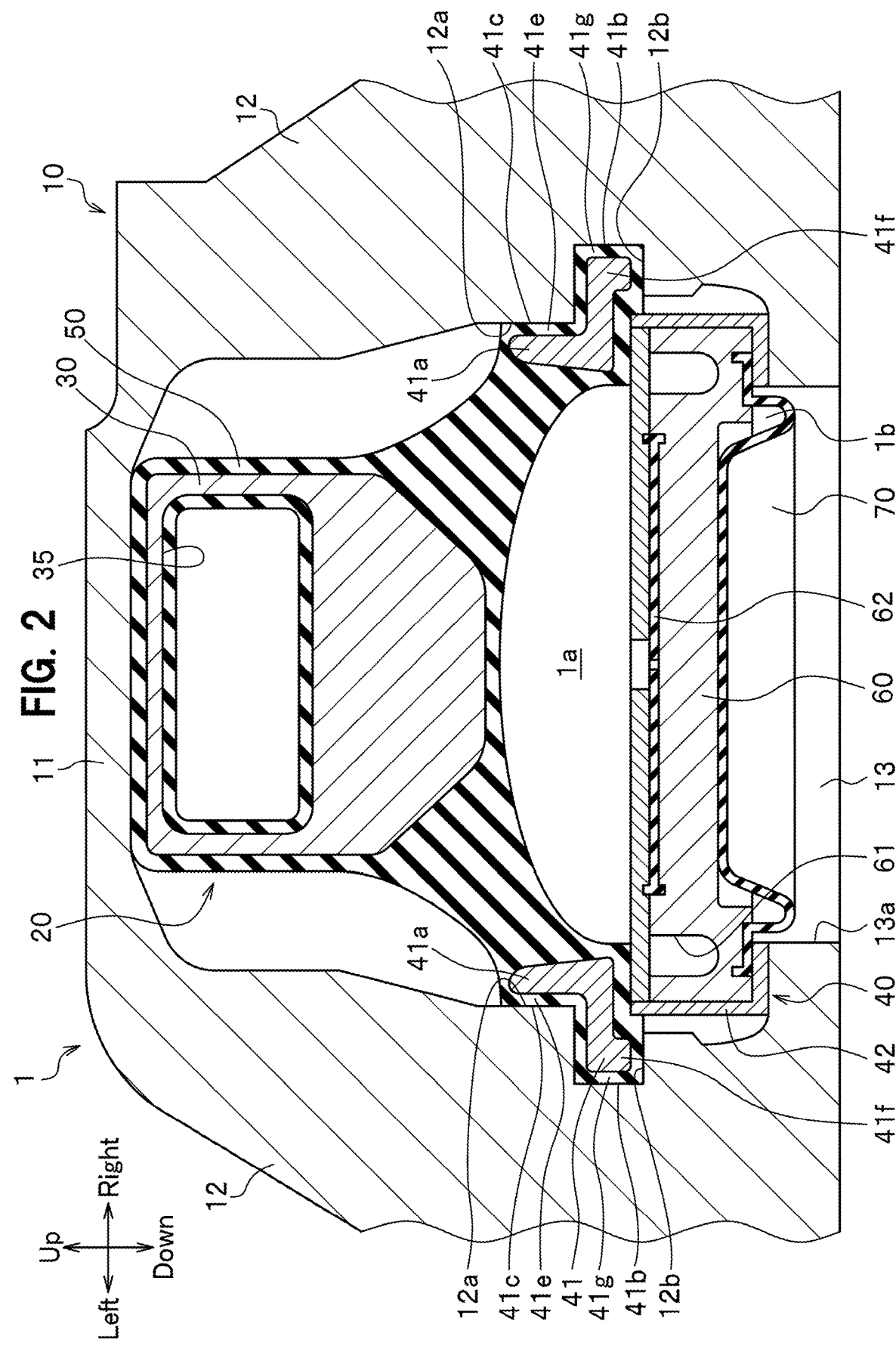

Embodiments of the invention will be explained in detail appropriately referring to the drawings. An up/down direction, a front/rear direction, and a left/right direction are described hereinafter for ease of understanding the vibration prevention device according to the embodiment of the invention and do not limit a configuration or a disposed state of the vibration prevention device according to the invention. According to the embodiment, a direction perpendicular to the up/down direction and the left/right direction described in FIG. 2 is the front/rear direction. Therefore, a direction toward a further side from the front of the sheet of FIG. 2 is the front direction and a direction toward a near side of the front of the sheet of FIG. 2 is the rear direction. Each of parts of a vibration prevention device 1 is appropriately exaggerated or simplified in each of the drawings according to the embodiment to clarify features of the invention.

Figure 1:
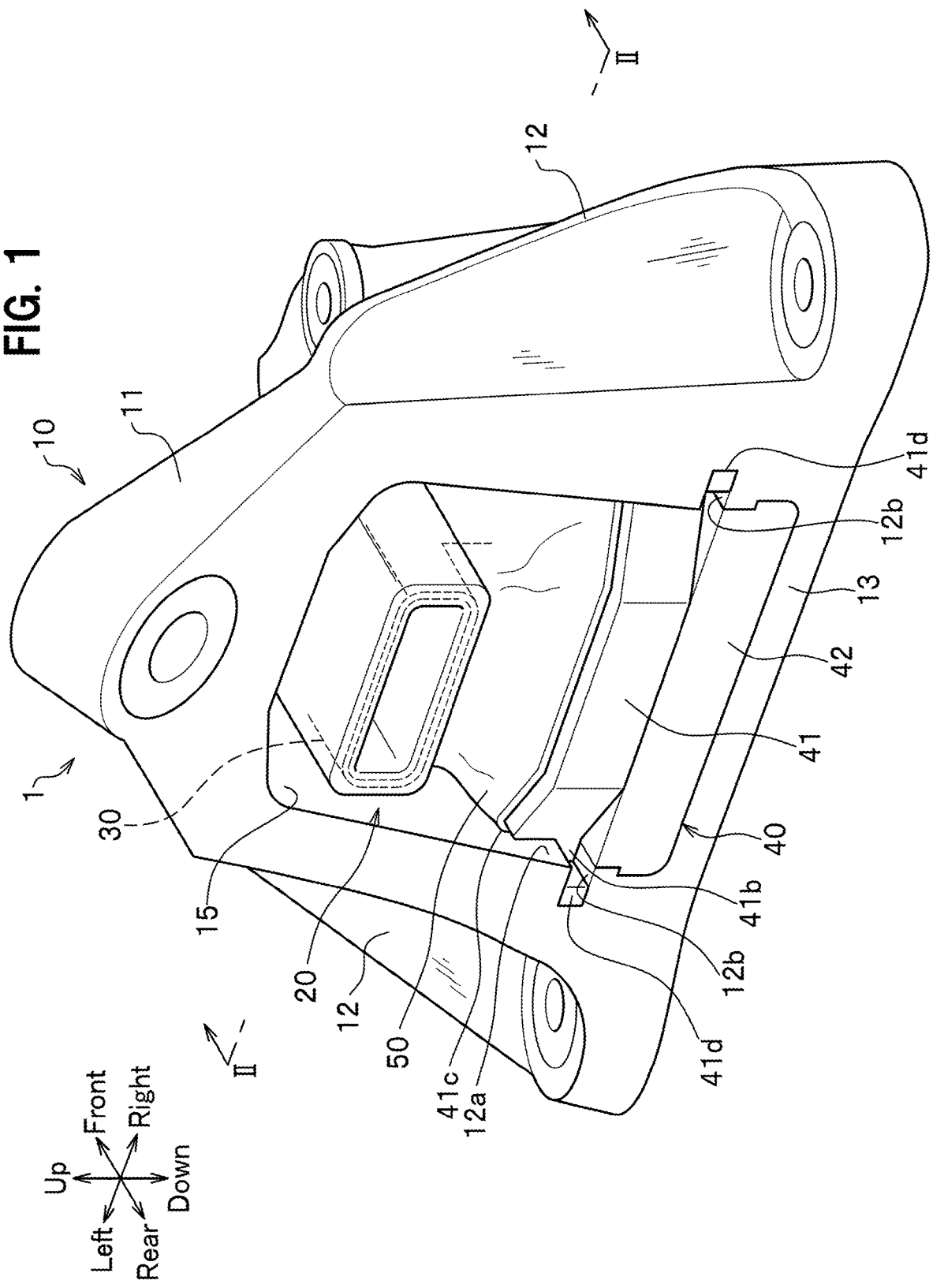
FIG. 1 A perspective view of a vibration prevention device according to an embodiment of the invention FIG. 2 A sectional view when the vibration prevention device illustrated in FIG. 1 is cut along the II-II plane FIG. 3 An enlarged sectional view for the attaching structure of the vibration prevention device according to the embodiment of the invention FIG. 4 A perspective view of a vehicle body-side bracket of the vibration prevention device according to the embodiment of the invention FIG. 5 A perspective view of a vibration prevention member according to the embodiment of the invention

The vibration prevention device 1 according to an embodiment is disposed, for example, between an engine and a vehicle body as shown in FIG. 1. The engine will be described hereinafter as an object to be protected against vibration. The vibration prevention device 1 comprises a vehicle body-side bracket 10 and a vibration prevention member 20 attached to the vehicle body-side bracket 10.

Figure 4:
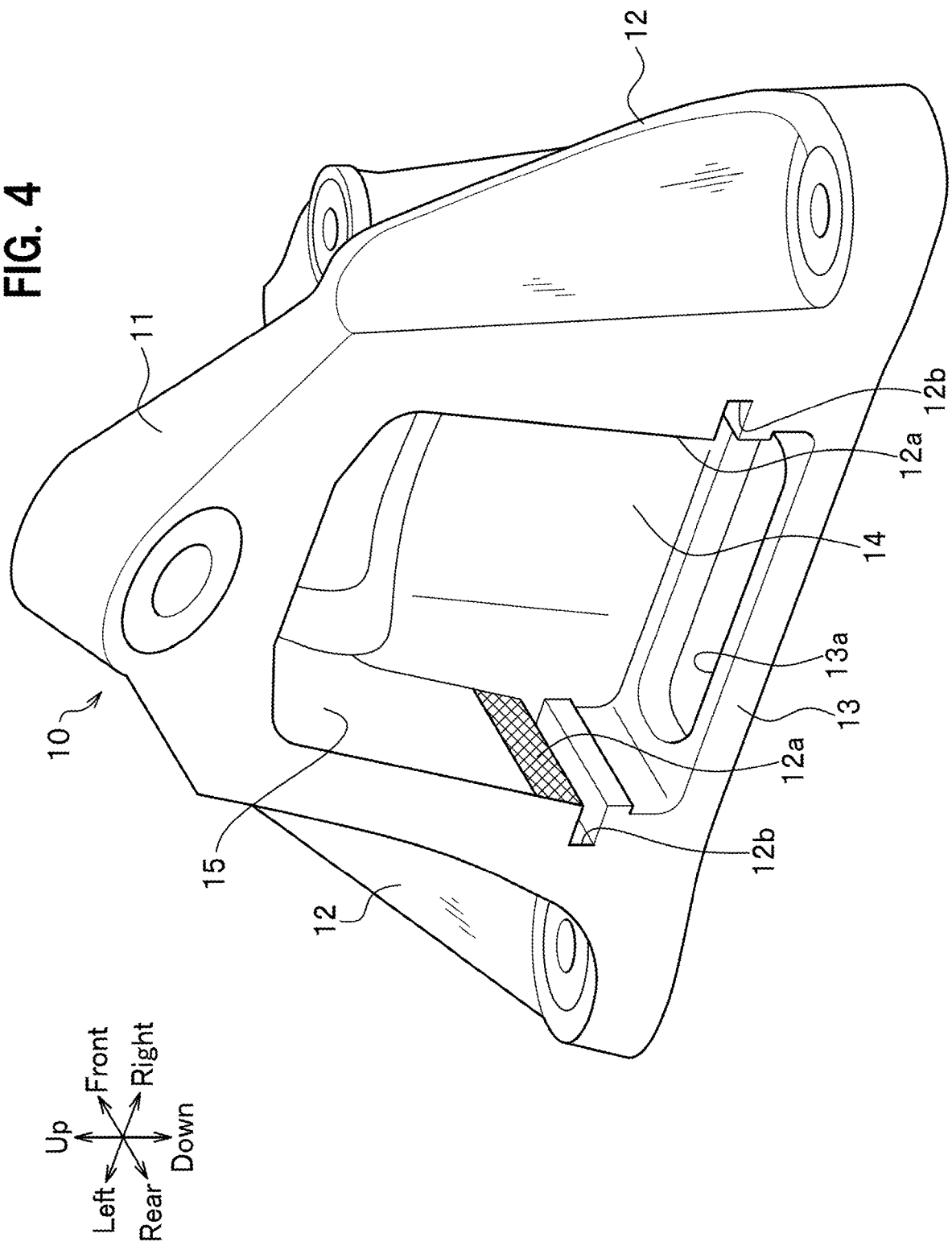

The vehicle body-side bracket 10 is a member made of a resin or a metal and attached to a vehicle body. The vehicle body-side bracket 10 according to the embodiment is a member made of a resin. The vehicle body-side bracket 10 has an apex portion 11, right and left legs 12, 12 extending in the down direction from the apex portion 11, a bottom portion 13 formed between lower ends of a pair of the legs 12, 12, and a front-wall portion 14 extending in the up direction from a front edge portion of the bottom portion 13 as shown in FIG. 4. The bottom portion 13 has a center opening 13a extending in the up/down direction. The vehicle body-side bracket 10 is attached to a vehicle body through a front end of the apex portion 11 and lower ends of the legs 12, 12.

An inner space 15 is formed between a pair of the legs 12, 12 and under the apex portion 11. The inner space 15 opens through a front surface and a rear surface of the vehicle body-side bracket 10.

The vibration prevention member 20 comprises a first attachment member 30, a second attachment member 40, an insulator 50 disposed between the first attachment member 30 and the second attachment member 40, a partition member 60, and a diaphragm 70 provided below the insulator 50 as shown in FIG. 2. The vibration prevention member 20 according to the embodiment is a type of a liquid-sealed vibration prevention member.

The first attachment member 30 made of a metal has a shape of an angular tube and is embedded in an upper end portion of the insulator 50 by insert molding. The first attachment member 30 has an insertion hole 35 extending in the front/rear direction. An engine-side bracket is inserted into the insertion hole 35 of the first attachment member 30. In this way, the first attachment member 30 is attached to the engine.

The second attachment member 40 comprises an upper side member 41 embedded in a lower end of the insulator 50 by insert molding and a lower side member 42 disposed below the upper side member 41. The upper side member 41 and the lower side member 42 according to the embodiment are made of a resin but this is not limited and the members may be made of a metal.

Figure 3:
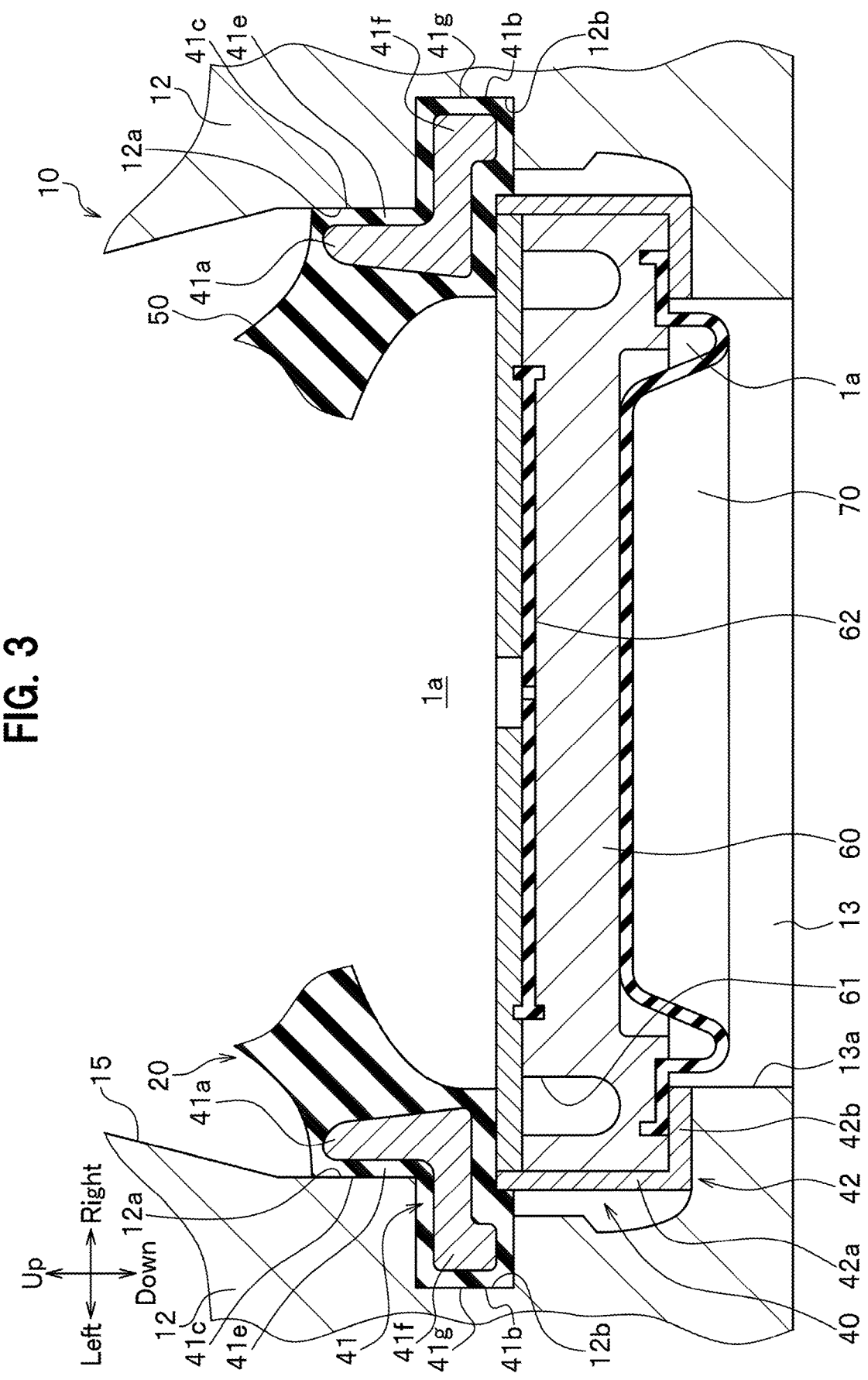

The upper side member 41 has an upper peripheral portion 41a having a tube shape and protrusion portions 41f, 41f projecting outwardly from lower ends of right and left outer surfaces of the upper peripheral portion 41a as shown in FIG. 3. The lower side member 42 has a lower peripheral portion 42a having a tube shape and a bottom plate 42b provided at a lower end of the lower peripheral portion 42a. The bottom plate 42b has a center opening.

The insulator 50 is an elastic member made of a rubber as shown in FIG. 2. The insulator 50 according to the embodiment can be made of any of various rubber materials. The first attachment member 30 is embedded in an upper portion of the insulator 50 by insert molding and the upper end portion of the insulator 50 has a shape of an angular tube. The lower end of the insulator 50 is disposed between peripheral portions of the upper side member 41. A lower portion of the insulator 50 has an inner space functioning as a main liquid chamber 1a.

The partition member 60 is fitted into the lower peripheral portion 42a of the lower side member 42 and is disposed on an upper surface of the bottom plate 42b of the lower side member 42 as shown in FIG. 3. The partition member 60 is disposed between a lower surface of the insulator 50 and the upper surface of the bottom plate 42b of the lower side member 42. An opening at a lower portion of the inner space of the insulator 50 is closed by the partition member 60. The main liquid chamber 1a is formed on the partition wall 60 as shown in FIG. 2. The main liquid chamber 1a is the inner space enclosed by an inner surface of the lower portion of the insulator 50 and an upper surface of the partition member 60.

The diaphragm 70 is provided under the partition member 60. The diaphragm 70 is made of a rubber and an outer peripheral edge portion of the diaphragm 70 is sandwiched between a lower surface of the partition member 60 and the upper surface of the bottom plate 42b of the lower side member 42 as shown in FIG. 2. An auxiliary liquid chamber 1b is formed between the partition member 60 and the diaphragm 70 as shown in FIG. 2. The auxiliary liquid chamber 1b has a space enclosed by the lower surface of the partition member 60 and an upper surface of the diaphragm 70.

An orifice passage 61 is formed through the partition member 60 to be in communication with the main liquid chamber 1a and the auxiliary liquid chamber 1b, and a non-compressible hydraulic fluid is contained within a continuous space defined by the main liquid chamber 1a, the auxiliary liquid chamber 1b, and the orifice passage 61. When vibration is transmitted to the first attachment member 30, the hydraulic fluid flows through the orifice passage 61 and as a result liquid column resonance is generated in the main liquid chamber 1a and the auxiliary liquid chamber 1b, which can effectively attenuate the vibration. An elastic movable membrane 62 is provided at the center of the partition member 60. The elastic movable membrane 62 elastically deforms in response to change in the internal pressure of the main liquid chamber 1a, and therefore fluctuations in the internal pressure of the main liquid chamber 1a are absorbed.

An attachment structure of the vehicle body-side bracket 10 and the vibration prevention member 20 will be next explained. The vibration prevention member 20 is disposed in the inner space 15 of the vehicle body-side bracket 10 as shown in FIG. 1. The vibration prevention member 20 is inserted between a pair of the legs 12, 12 and is fixed to the vehicle body-side bracket 10 by press-fitting.

As shown in FIG. 4, a press-fitting surface 12a and a press-fitting groove 12b are formed on an inner surface of the leg 12 and extend in the front/rear direction. According to the embodiment, the press-fitting surfaces 12a, 12a and the press-fitting grooves 12b, 12b are formed on the inner surfaces of a pair of the legs 12, 12 as shown in FIG. 4. The right and left press-fitting surfaces 12a, 12a are formed in a left/right symmetrical manner with each other, and the right and left press-fitting grooves 12b, 12b are formed in a left/right symmetrical manner with each other.

The press-fitting surfaces 12a, 12a are formed at substantially the centers of the inner surfaces of the legs 12, 12 in the up/down direction. The press-fitting surfaces 12a, 12a are formed such that a normal line of each of the press-fitting surfaces 12a, 12a extends in the horizontal direction as shown in FIG. 3. The press-fitting surfaces 12a, 12a have band shapes and extend frontward from a rear edge portion of the inner space 15 as shown in FIG. 4. In other words, the press-fitting surfaces 12a, 12a extend from front edge portions of the legs 12, 12 to rear edge portions of the legs 12, 12.

Axial sections of the press-fitting grooves 12b, 12b extending along lower edge portions of the press-fitting surfaces 12a, 12a have rectangular shapes. The press-fitting grooves 12b, 12b extend outwardly from the press-fitting surfaces 12a, 12a. The press-fitting grooves 12b, 12b extends linearly frontward from the rear edge portion of the inner space 15. In other words, the press-fitting grooves 12b, 12b extend from the front edge portions of the legs 12, 12 to the rear edge portions of the legs 12, 12. Rear edge portions of the press-fitting grooves 12b, 12b open through the rear surface of the vehicle body-side bracket 10.

Figure 5:
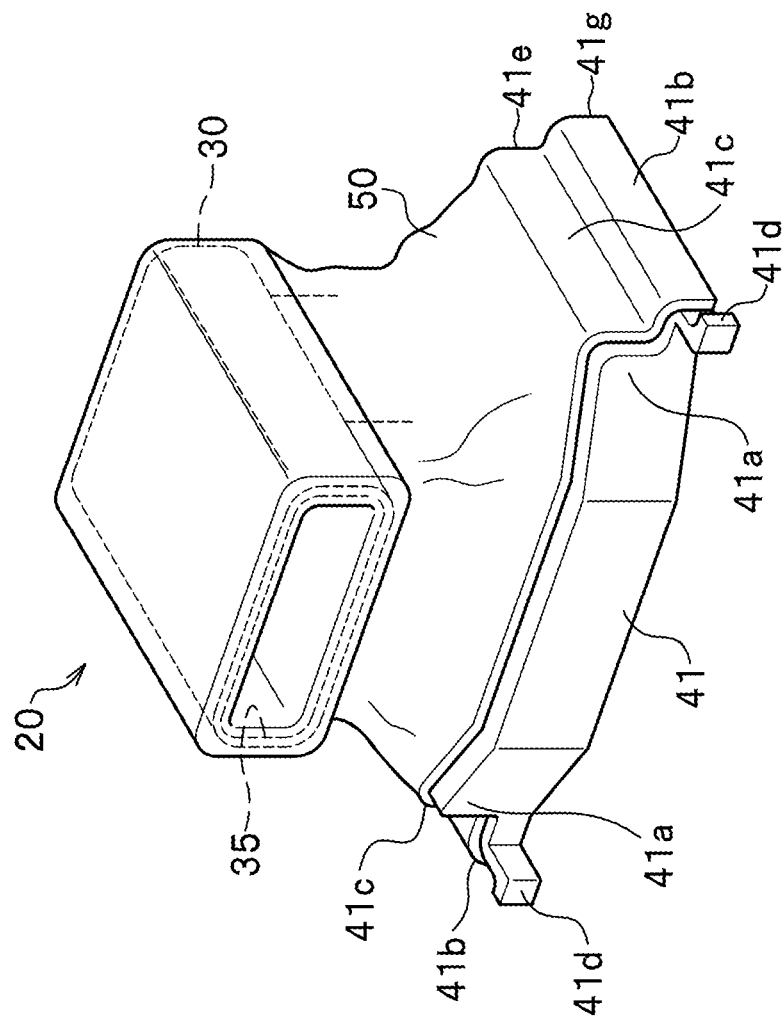

The vibration prevention member 20 has abutting portions 41c, 41c and attachment portions 41b, 41b which extend in the front/rear direction as shown in FIG. 5. The abutting portions 41c, 41c and the attachment portions 41b, 41b are formed at the right and left sides of the upper side member 41 of the second attachment member 40 as shown in FIG. 3. The right and left abutting portions 41c, 41c are formed in a left/right symmetrical manner with each other and the right and left attachment portions 41b, 41b are formed in a left/right symmetrical manner with each other.

The abutting portions 41c, 41c comprise the upper peripheral portions 41a, 41a of the upper side member 41 and elastic members 41e, 41e made of a rubber covering outer surfaces of the upper peripheral portions 41a, 41a. According to the embodiment, the elastic members 41e, 41e covering the outer surfaces of the upper peripheral portions 41a, 41a are a part of the insulator 50 as shown in FIG. 5. When the vibration prevention member 20 is attached to the vehicle body-side bracket 10, the abutting portions 41c, 41c are pressed against the press-fitting surfaces 12a, 12a. Side surfaces of the abutting portions 41c, 41c have the same shapes of the press-fitting surfaces 12a, 12a. The side surfaces of the abutting portions 41c, 41c have band shapes and extend from a front edge portion of the upper side member 41 to a rear edge portion of the upper side member 41 as shown in FIG. 5.

The attachment portions 41b, 41b extend along lower edge portions of the side surfaces of the abutting portions 41c, 41c. The attachment portions 41b, 41b extend from the front edge portion of the upper side member 41 to the rear edge portion of the upper side member 41. The attachment portions 41b, 41b comprise the protrusion portions 41f, 41f and elastic members 41g, 41g covering the protrusion portions 41f, 41f. The elastic members 41g, 41g cover all of the surfaces of the protrusion portions 41b, 41b facing inner surfaces of the press-fitting grooves 12b, 12b. According to the embodiment, the elastic members 41g, 41g covering the protrusion portions 41f, 41f are a part of the insulator 50.

When the vibration prevention member 20 is attached to the vehicle body-side bracket 10, the attachment portions 41b, 41b are press-fitted into the press-fitting grooves 12b, 12b. Upper surfaces, side surfaces, and lower surfaces of the attachment portions 41b, 41b are respectively pressed against inner upper surfaces, inner side surfaces, and inner lower surfaces of the press-fitting grooves 12b, 12b. In this way, the attachment portions 41b, 41b are fitted into the press-fitting grooves 12b, 12b so as to be in close contact with each other.

The vibration prevention member 20 according to the embodiment has hook portions 41d, 41d on rear edge portions of the attachment portions 41b, 41b as shown in FIG. 5. When the attachment portions 41b, 41b are press-fitted into the press-fitting grooves 12b, 12b, the hook portions 41d, 41d are pressed against inner surfaces of rear portions of the press-fitting grooves 12b, 12b and are then hooked onto the rear surface of the vehicle body-side bracket 10 to position the attachment portions 41b, 41b, relative to the press-fitting grooves 12b, 12b as shown in FIG. 1.

When the vibration prevention member 20 is attached to the vehicle body-side bracket 10, the vibration prevention member 20 is inserted into the inner space 15 of the vehicle body-side bracket 10 from the rear of vehicle body-side bracket 10 as shown in FIG. 2. In detail, the attachment portions 41b, 41b of the vibration prevention member 20 are inserted into the press-fitting grooves 12b, 12b from the rear of the inner space 15 of the vehicle body-side bracket 10, and then the abutting portions 41c, 41c of the vibration prevention member 20 overlap the press-fitting surfaces 12a, 12a. The bottom plate 42b of the lower side member 42 overlaps an upper surface of the bottom portion 13 of the vehicle body-side bracket 10.

In this way, when the vibration prevention member 20 is inserted into the inner space 15 of the vehicle body-side bracket 10, the attachment portions 41b, 41b are press-fitted into the press-fitting grooves 12b, 12b and the abutting portions 41c, 41c of the vibration prevention member 20 are pressed against the press-fitting surfaces 12a, 12a. Therefore, the vibration prevention member 20 is fixed to the vehicle body-side bracket 10.

As shown in FIG. 1, the vibration prevention device 1 described above comprises the vehicle body-side bracket 10 having the inner space 15 and the vibration prevention member 20 inserted into the inner space 15. The inner space 15 opens through an outer surface of the vehicle body-side bracket 10. The press-fitting surfaces 12a, 12a and the press-fitting grooves 12b, 12b extending outwardly from the press-fitting surfaces 12a, 12a are formed on inner surfaces of the vehicle body-side bracket 10 as shown in FIG. 2. The press-fitting surfaces 12a, 12a and the press-fitting grooves 12b, 12b extend frontward from the rear edge portion of the inner space 15. The vibration prevention member 20 comprises the first attachment member 30, the second attachment member 40, the insulator 50 disposed between the first attachment member 30 and the second attachment member 40. The second attachment member 40 has the abutting portions 41c, 41c pressed against the press-fitting surfaces 12a, 12a and the attachment portions 41b, 41b press-fitted into the press-fitting grooves 12b, 12b.

According to the vibration prevention device 1 of the embodiment, the attachment portions 41b, 41b are press-fitted into the press-fitting grooves 12b, 12b, and therefore the areas of the press-fitting surfaces 12a, 12a of the vehicle body-side bracket 10 and the areas of the abutting portions 41c, 41c of the vibration prevention member 20 can be reduced and, moreover, the vibration prevention member 20 can be securely fixed to the vehicle body-side bracket 10. Therefore, according to the vibration prevention device 1 of the embodiment, the vehicle body-side bracket 10 and the vibration prevention member 20 can be compact and as a result the size of the entire vibration prevention device can be reduced.

According to the vibration prevention device 1 of the embodiment, the vehicle body-side bracket 10 has the apex portion 11, a pair of the legs 12, 12 extending in the down direction from the apex portion 11. The inner space 15 is formed between a pair of the legs 12, 12 and the press-fitting surfaces 12a, 12a are formed on the inner surfaces of the legs 12, 12 and, moreover, the press-fitting grooves 12b, 12b are formed on the inner surfaces of the legs 12, 12. According to this configuration, the heights of the press-fitting surfaces 12a, 12a and the abutting portions 41c, 41c can be reduced, and the vibration prevention member 20 can be securely fixed to the vehicle body-side bracket 10, and as a result the heights of the vehicle body-side bracket 10 and the vibration prevention member 20 can be reduced.

According to the vibration prevention device 1 of the embodiment, all of the surfaces of the attachment portions 41b, 41b abutting the inner surfaces of the press-fitting grooves 12b, 12b are pressed against the inner surfaces of the press-fitting grooves 12b, 12b as shown in FIG. 3. According to this configuration, the press-fitting grooves 12b, 12b are small enough such that outer surfaces of the attachment portions 41b, 41b are pressed against the inner surfaces of the press-fitting grooves 12b, 12b without a gap and as a result the size of the vehicle body-side bracket 10 can be reduced.

According to the vibration prevention device 1 of the embodiment, the elastic members 41g, 41g cover all of the outer surfaces of the protrusion portions 41f, 41f facing the inner surfaces of the press-fitting grooves 12b, 12b. According to this configuration, the elastic members 41g, 41g are sandwiched between the inner surfaces of the press-fitting grooves 12b, 12b and the outer surfaces of the protrusion portions 41b, 41b, and therefore the attachment portions 41b, 41b can be securely press-fitted into the press-fitting grooves.

Although the embodiments of this invention have been described above, the invention is not limited to the embodiments and changes as well as modifications can be appropriately made hereto without departing from the spirit and the scope of the present disclosure. According to the embodiment, the liquid-sealed vibration prevention member 20 is used but a configuration of the vibration prevention member 20 is not limited to this type and the vibration prevention device 1 may not, for example, have the main liquid chamber 1a and the auxiliary liquid chamber 1b.

According to the vibration prevention device 1 of the embodiment, the second attachment member 40 comprises the upper side member 41 and the lower side member 42, but the upper side member 41 and the lower side member 42 may be integrated into a single member.

According to the vibration prevention device 1 of the embodiment, the elastic members 41e, 41e and the elastic members 41g, 41g may have slits or recesses. According to this configuration, when the vibration prevention member 20 is inserted into the vehicle body-side bracket 10, a part of the insulator covering the outer surfaces of the upper peripheral portions 41a, 41a of the abutting portions 41c, 41c and covering all of the surfaces of the protrusion portions 41b, 41b facing the inner surfaces of the press-fitting grooves 12b, 12b warps, and therefore the attachment portions 41b, 41b can be easily press-fitted into the press-fitting grooves 12b, 12b and the abutting portions 41c, 41c can be easily pressed against the press-fitting surfaces 12a, 12a.

The whole of each of surfaces of the abutting portions 41c, 41c and the attachment portions 41b, 41b may not be on the press-fitting surfaces 12a, 12a and on the inner surfaces of the press-fitting grooves 12b, 12b, and a part of each of the surfaces of the abutting portions 41c, 41c and the attachment portions 41b, 41b may be separated from the press-fitting surfaces 12a, 12a and the inner surfaces of the press-fitting grooves 12b, 12b. Each of the surfaces of the abutting portions 41c, 41c and the attachment portions 41b, 41b may not be covered by the elastic members 41e, 41e and the elastic members 41g, 41g.

According to the vibration prevention device 1 of the embodiment, the engine-side bracket is inserted into the insertion hole 35 of the first attachment member 30 but a method to fix the first attachment member 30 to the engine-side bracket is not limited to this. For example, the first attachment member 30 may be fixed to the engine-side bracket by a bolt.

The vibration prevention device 1 of the embodiment is disposed between the engine and the vehicle body but an object which a vibration prevention device of the invention can be applied to and is protected against vibration by the vibration prevention device is not limited. For example, an object to be protected against vibration may be an inverter, a battery, or the like other than an engine. The shapes of an engine-side bracket and a vehicle body-side bracket are appropriately formed according to the shape of an object to be protected against vibration.

What is claimed is:

1. A vibration prevention device comprising:
    a bracket having an inner space that opens through a rear surface of the bracket;
    a vibration prevention member disposed in the inner space;
    wherein the inner space opens through an outer surface of the bracket;
    wherein a press-fitting surface and a press-fitting groove extending outwardly from the press-fitting surface are formed on an inner surface of the bracket;
    wherein the press-fitting surface and the press-fitting groove extend linearly frontward from a rear edge portion of the inner space opening, and extend through the rear surface of the bracket;
    wherein the vibration prevention member comprises a first attachment member, a second attachment member, and an insulator disposed between the first attachment member and the second attachment member; and, wherein the second attachment member has an abutting portion pressed against the press-fitting surface and an attachment portion press-fitted into the press-fitting groove.

2. The vibration prevention device of claim 1, wherein:
the bracket has an apex portion and a pair of legs extending in a down direction from the apex portion and the inner space is formed between the pair of legs, and the press-fitting surface and press-fitting groove are formed on an inner surface of at least one of the pair of legs.

3. The vibration prevention device of claim 1, wherein:
all of the surfaces of the attachment portion abutting inner surfaces of the press-fitting groove are pressed against the inner surfaces of the press-fitting groove.

4. The vibration prevention device of claim 2, wherein:
all of the surfaces of the attachment portion abutting inner surfaces of the press-fitting groove are pressed against the inner surfaces of the press-fitting groove.

5. The vibration prevention device of claim 3, wherein:
the attachment portion comprises a protrusion portion and an elastic member;
the elastic member is a part of the insulator; and
the elastic member covers all of the surfaces of the protrusion portion facing the inner surfaces of the press-fitting groove.

6. The vibration device of claim 4, wherein:
the attachment portion comprises a protrusion portion and an elastic member;
the elastic member is a part of the insulator; and
the elastic member covers all of the surfaces of the protrusion portion facing the inner surfaces of the press-fitting groove.

7. The vibration prevention device of claim 1, wherein the press-fitting groove has an axial section of a rectangular shape.

8. The vibration prevention device of claim 1, wherein the vibration prevention member is inserted into the inner space of the bracket from the rear surface of the bracket such that the attachment portion of the vibration prevention member is inserted into the press-fitting groove from the rear edge portion of the inner space opening.

9. The vibration prevention device of claim 1, wherein the press-fitting surface and the abutting portion have band shapes.

10. The vibration prevention device of claim 1, wherein the abutting portion extends from a front edge portion of the second attachment member.

11. The vibration prevention device of claim 2, wherein the press-fitting surface and the press-fitting groove extend from a rear edge portion of the at least one of the pair of legs.

12. The vibration prevention device of claim 2, wherein the press-fitting surface and the press-fitting groove extend from a rear edge portion of the at least one of the pair of legs to a front edge portion of the at least one of the pair of legs.

13. A vibration prevention device comprising:
a bracket having an inner space;
a vibration prevention member disposed in the inner space;
wherein the inner space opens through an outer surface of the bracket;
wherein a press-fitting surface and a press-fitting groove extending outwardly from the press-fitting surface are formed on an inner surface of the bracket;
wherein the press-fitting surface and the press-fitting groove extend from an edge portion of the inner space opening through an outer surface of the bracket;
wherein the vibration prevention member comprises a first attachment member, a second attachment member, and an insulator disposed between the first attachment member and the second attachment member;
wherein the second attachment member has an abutting portion pressed against the press-fitting surface and an attachment portion press-fitted into the press-fitting groove; and,
wherein the attachment portion comprises a hook portion on a rear edge portion of the attachment portion such that when the attachment portion is press-fitted into the press-fitting groove, the hook portion is hooked onto the bracket by being pressed against a rear portion of the press-fitting groove.

* * * * *